(No Model.) 2 Sheets—Sheet 1.
G. H. WILLIAMS & L. W. PALMER.
FOG SIGNAL.
No. 497,153. Patented May 9, 1893.
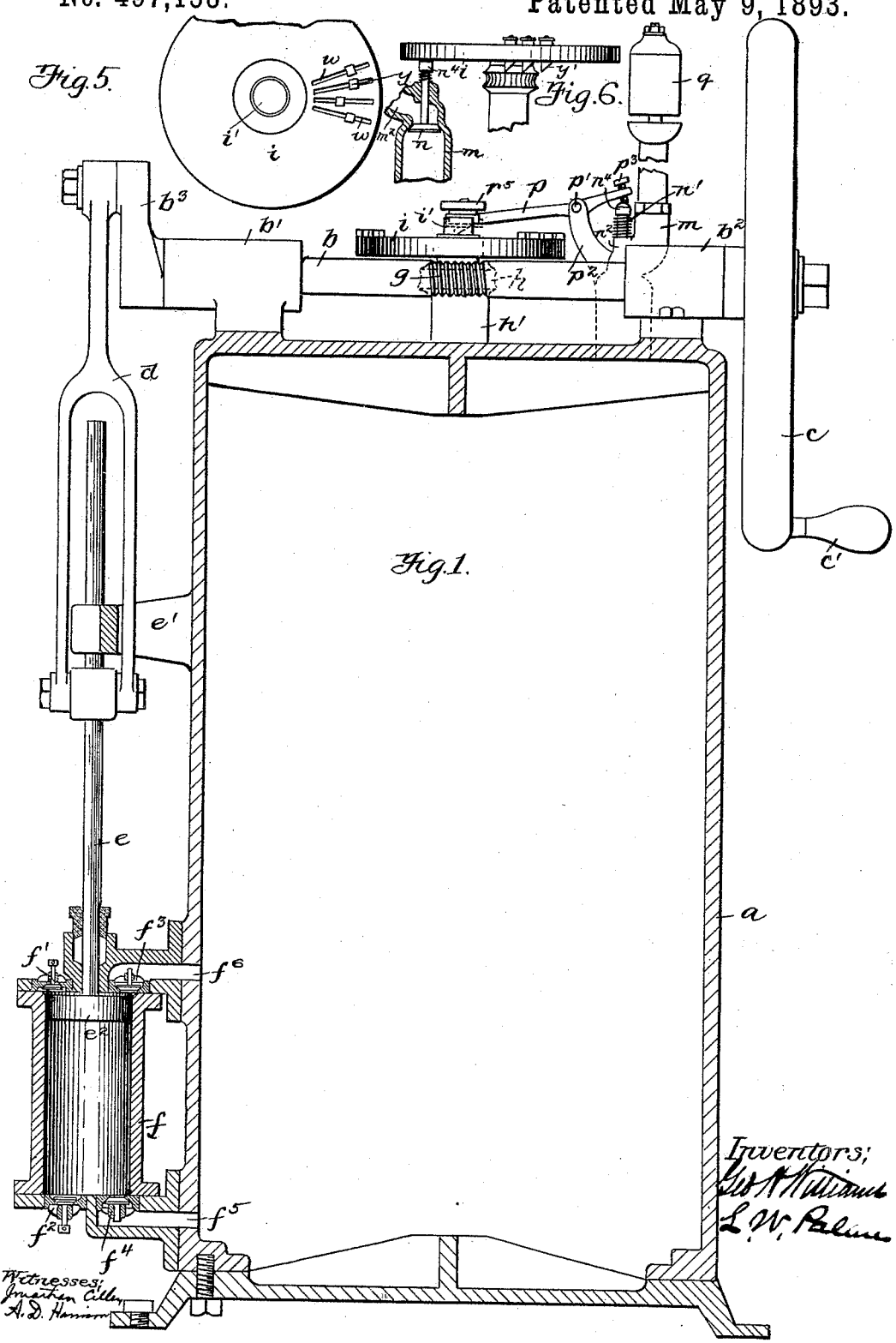

(No Model.) 2 Sheets—Sheet 2.
G. H. WILLIAMS & L. W. PALMER.
FOG SIGNAL.
No. 497,153. Patented May 9, 1893.
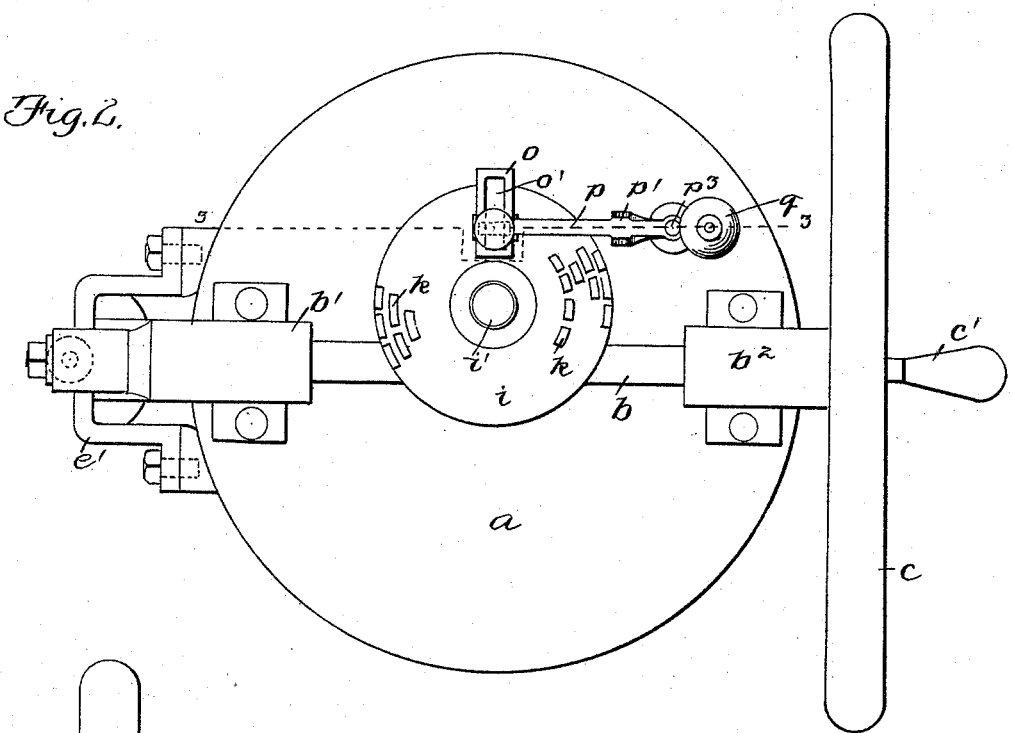
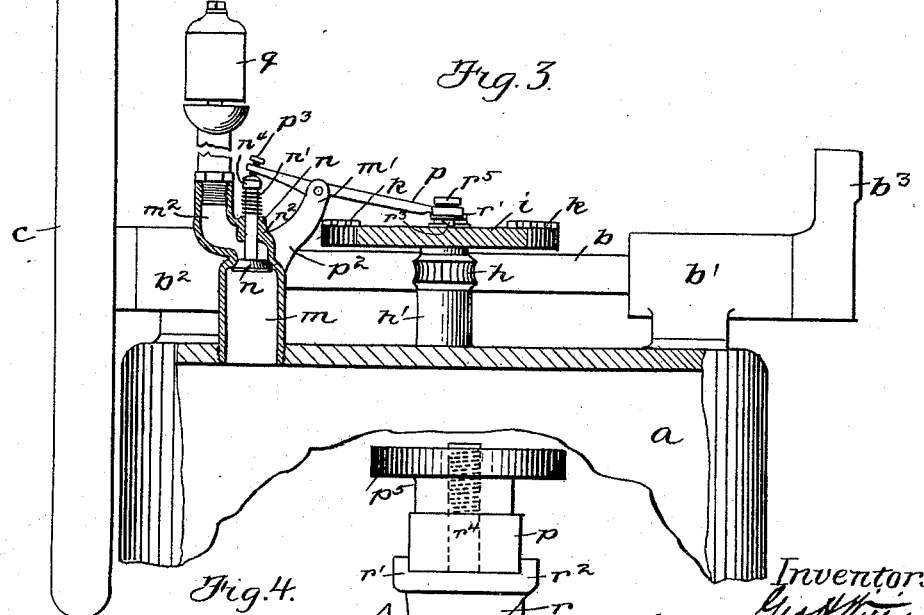
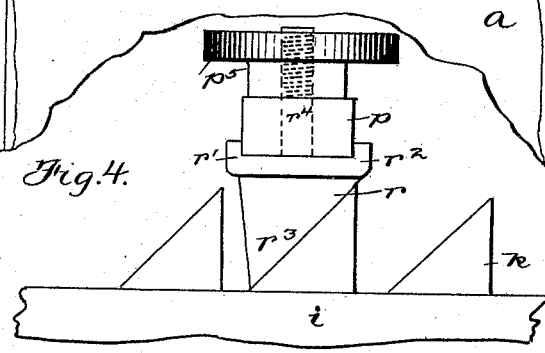

UNITED STATES PATENT OFFICE.

GEORGE H. WILLIAMS, OF NEWTON, MASSACHUSETTS, AND LUCIEN W. PALMER, OF PROVIDENCE, RHODE ISLAND.

FOG-SIGNAL.

SPECIFICATION forming part of Letters Patent No. 497,153, dated May 9, 1893.

Application filed May 26, 1892. Serial No. 434,474. (No model.)

*To all whom it may concern:*

Be it known that we, GEORGE H. WILLIAMS, of Newton, in the county of Middlesex and State of Massachusetts, and LUCIEN W. PALMER, of Providence, in the county of Providence and State of Rhode Island, have invented certain new and useful Improvements in Fog-Signals, of which the following is a specification.

This invention has reference to apparatus for sounding fog or other warning signals and has for its object to provide means whereby a given number of blasts may be sounded upon a whistle, horn or other pneumatic device at predetermined intervals, and further to provide means by which the number of blasts may be varied at will.

A special advantage in our invention lies in the fact that it may be used independently of steam or other force requiring a considerable application in the generation of the power and is therefore extremely advantageous on sailing ships or signaling stations remote from any steam or other plant.

Another meritorious feature of the invention consists in the generation of the sound producing fluid simultaneously with the operation of the sound producing mechanism, thus combining two operations into one.

The invention contemplates in the best embodiment thereof now known to us, a suitable tank or reservoir of sufficient strength to stand a considerable pressure, upon which is journaled a shaft provided with means for rotating it, preferably a hand wheel. To the shaft is affixed a crank connected with a piston rod traveling in a suitable cylinder which is provided with inlet and outlet valve mechanism and passages leading into the reservoir. The said shaft is provided with a worm screw, meshing with a worm gear located upon the reservoir, said gear being secured fixedly to a spindle which revolves a disk or plate. Upon the face of the disk are members for operating the sound producing mechanism, each member consisting preferably of one or more upwardly projecting teeth or cams, the several members being arranged in segmental rows concentric with the axis of the spindle, and each member when in operation engaging one end of a pivoted lever mounted upon the reservoir. The other end of this lever is arranged to act upon a suitable valve by which the operating fluid in the tank is admitted to the signal device. It will be observed that rotation of the shaft will pump air into the tank and will at the same time revolve the disk or plate to sound the signal.

Means are provided whereby any one of the members on the rotary plate may be caused to actuate the valve, said members being composed of different numbers of teeth or cams according to the established code of signals.

We shall now proceed to describe our said invention as it is embodied in a convenient form of apparatus, although it will be obvious that we are not limited to the construction and arrangement of parts shown and described.

In the accompanying drawings forming a part of this specification, Figure 1 is a view partly in section showing the reservoir, cylinder and its valves, the shaft and whistle operating device. Fig. 2 is a top plan of the apparatus showing a suitable disposition of the teeth or cams; Fig. 3 a sectional view on line 3 3 of Fig. 2; Fig. 4 a detail of the tooth engaging device on the pivoted lever; Fig. 5 a modification showing another disposition of the teeth on the plate or disk, and Fig. 6 another modification.

In the drawings—$a$ is the tank or reservoir, upon the top of which is located a shaft $b$ journaled in bearings $b'$ $b^2$ secured upon the reservoir in any suitable manner. A wheel $c$ is secured to shaft $b$ and is provided with handle $c'$ by which the shaft is rotated. To said shaft is affixed a crank $b^3$, which is connected by a link $d$ secured to a piston $e$ and adapted to reciprocate the latter and the piston head $e^2$ to which it is attached. A bracket $e'$ secured to the reservoir serves as a guide for the rod $e$.

$f$ represents a cylinder affixed to the reservoir $a$ and provided with inlet valves $f'$ $f^2$ and outlet valves $f^3$ $f^4$ so disposed that the downward stroke of the piston admits air through valve $f'$ and discharges into the tank through valve $f^4$ and passage $f^5$. The return stroke of the piston closes these valves and charges the reservoir through valves $f^2$ and $f^3$ and passage $f^6$.

$i$ represents a disk or plate affixed to a stud or shaft $i'$ which is journaled in a bearing $h'$ on the tank $a$. The shaft $i'$ has a worm gear $h$ which engages a worm $g$ on the shaft $b$. The disk or plate $i$ supports the whistle operating members which are preferably composed of teeth or cams $k$ arranged in segmental rows concentric with the axis of the disk, each row being provided with a given number of teeth or cams so that each row or member will produce one or more blasts of the alarm device as determined by the established code of signals. These teeth or cams may be of any desired configuration but are preferably beveled to permit the engaging device on lever $p$ hereinafter described to travel readily over the same, and may have a sufficient plane horizontal surface to sound a blast of any required length.

The teeth or cams constitute whistle operating members, each composed of one or more cams, the number of cams in each member differing from the number in any of the others. For example one member may have one cam and will therefore actuate the valve presently described to give one whistle. Another member may have two cams and so on, the number of cams in each member being preferably such that the apparatus can give the signals according to the legally established code.

In the top of the tank is secured a suitable pipe $m$ constituting a port in which is seated a valve $n$ whose stem extends through guide $n^2$ and is provided with a shoulder $n^4$ and a coil spring $n'$, whose tendency is to press the valve against its seat against the action of the lever $p$. A passage $m^2$ leads to the whistle or other alarm device $q$.

$p$ represents a whistle operating lever which is fulcrumed at $p'$ in a bracket $p^2$ formed on the pipe $m$, and is provided with an adjusting screw $p^3$ which bears on the stem of the valve $n$. The other extremity of the lever has a lateral enlargement $o$ in which is a slot $o'$. An adjustable tooth or cam $r$ is adapted to slide in said slot and is provided with ears or guides $r'$ $r^2$ bearing on the enlarged end of the lever $p$. The tooth $r$ is adjustable in the slot $o'$ so that it may be engaged with either of the members $k$ on the plate $i$, the tooth $r$ having a threaded shank $r^4$ extending through the slot $o'$ and provided with a clamping nut $r^5$ by which the engaging piece may be secured at any desired adjustment. The spring $n'$ which closes the valve exerts a yielding pressure on the lever $p$, and thus holds the tooth $r$ of said lever yieldingly against the plate $i$, so that when the members $k$ on said plate meet the tooth $r$ they raise said tooth thus depressing the opposite end of the lever $p$ and opening the valve, each member $k$ causing the valve to open one or more times according to the number of teeth or cams of which it is composed.

It will be seen from the foregoing that when the shaft $b$ is rotated it will not only operate the air compressor and charge the reservoir, but also operate the valve and cause the air pressure to give the desired signal. The operation of the valve may therefore be considered automatic, the operator having nothing to do excepting to operate the air compressor and adjust the connection between the members $k$ and the valve to produce the required number of blasts. The members $k$ are so arranged that after each blast or series of blasts there will be no further operation of the valve until the air compressor has had time to accumulate a considerable pressure in the reservoir so that there will be no liability of failure to give a distinct blast wherever a member $k$ arrives at its operative position.

We do not limit ourselves to making the tooth $r$ on the lever $p$ adjustable as, if desired, the teeth or cams on the plate $i$ may be made adjustable instead of the tooth $r$; and for the same purpose, viz: to enable any desired number of blasts to be given at each operation. In Fig. 5 we show as one way of adjusting the teeth or cams on the plate $i$, a series of radial slots $w$ formed in said plate and a corresponding series of teeth or cams $y$ movable in said slots, there being one tooth or cam for each slot.

Any suitable devices may be provided for securing the teeth $y$ at any position to which they may be adjusted in the slots.

It is obvious that the arrangement of the cams or whistle operating members, as shown in Fig. 2, may be greatly varied and said members may consist of elevations, depressions, attachments, extensions, holes or pins, located on the top, bottom or edge of the plate which supports them and they may be fixed, movable, attached or detached.

The lever $p$ communicating motion to the whistle valve may be dispensed with entirely and the valve stem so placed as to come in direct contact with the whistle operating members or cams on the disk $i$ as shown in Fig. 6, in which teeth or cams $y'$ preferably adjustably secured to the disk, are arranged on the under side thereof, the head $n^4$ of the valve stem being also under the disk—so that the valve will be opened by the direct action of the teeth $y'$ on its stem.

Any other suitable gearing or devices may be used to impart motion to the disk or plate $i$, and any other suitable valve operating mechanism may be substituted for the disk or plate and its valve operating cams or members.

We claim—

1. In a fog signal, the combination of a whistle or pneumatic alarm device, a compressed air reservoir, a valve controlling the passage of air from the reservoir to the whistle, an air compressor, a motor connected with the air compressor, and an adjustable valve operating mechanism connected with the motor, said compressor and valve operating mechanism being actuated simultaneously by the motor, the adjustability of said mechanism enabling the apparatus to give and repeat different signals, as set forth.

2. In a fog signal, the combination of a whistle or pneumatic alarm device, a compressed air reservoir, a valve controlling the passage of air from the reservoir to the whistle, a cylinder having valved heads communicating with the reservoir, a piston in said cylinder, a crank shaft journaled in bearings on the reservoir, connections between said crank shaft and piston whereby the latter is reciprocated by the rotation of the crank shaft, and an adjustable valve operating mechanism actuated by the rotation of the crank shaft, whereby the valve is operated automatically when the reservoir is being charged, the adjustability of said mechanism enabling the apparatus to give and repeat different signals as set forth.

3. In a fog signal, the combination of a whistle or pneumatic alarm device, a compressed air reservoir, a valve controlling the passage of air from the reservoir to the whistle, a crank shaft journaled in bearings on the reservoir, an air compressor connected with the crank shaft, and an adjustable valve operating mechanism comprising a rotary disk or plate geared to the crank shaft, and provided with whistle operating teeth or cams, and a pivoted lever arranged to be moved by said cams and to give motion to the whistle valve, suitable parts of said mechanism being adjustable, to enable the apparatus to give and repeat different signals, as set forth.

4. In a fog signal, the combination of a whistle, or like signal device, a valve controlling the passage of an operating fluid to the whistle, a rotary disk or plate located contiguous to the valve, and provided with a series of whistle operating members arranged at different distances from the axis of the plate, each member consisting of one or more teeth or cams, means for rotating said plate, a lever pivoted to a fixed support and engaged at one end with the valve, and an adjustable tooth or cam at the other end of said lever, said tooth being adapted to be adjusted to engage either of the whistle operating members on the rotary plate, and provided with means whereby it may be secured to the lever in any position to which it may be adjusted, as set forth.

5. In a fog signal, the combination of a whistle or like signal device, a valve controlling the passage of an operating fluid to the whistle, a rotary disk or plate having whistle operating teeth or cams, means for rotating said plate, a pivoted lever arranged to be moved by said cams to operate the valve, and means for varying the extent of movement imparted to the lever by the cams, whereby the duration of each blast may be varied, as set forth.

6. In a fog signal the combination of a compressed air reservoir, a whistle or other signal device, and adjustable mechanism connected therewith for operating the same, and an air compressor whereby any desired pressure may be stored in the reservoir to operate the signal device for sounding the signals automatically.

7. In a fog signal the combination of a compressed air reservoir, an air compressor, a whistle or other signal device, a motor adapted to continuously operate the air compressor and an adjustable intermittently acting whistle operating mechanism connected with said motor, the continuous operation of the compressor enabling the pressure to be stored up between the periods of action of the whistle operating mechanism.

In testimony whereof we have signed our names to this specification, in the presence of two subscribing witnesses, this 23d day of May, A. D. 1892.

GEORGE H. WILLIAMS.
LUCIEN W. PALMER.

Witnesses:
C. F. BROWN,
A. D. HARRISON.